United States Patent [19] [11] 4,091,828
Jorgensen [45] May 30, 1978

[54] MANUALLY OPERABLE CRUTCH AND CANE STAND

[76] Inventor: Larry C. Jorgensen, Rte. 6, Lotus Club Rd., St. Joseph, Mo. 64504

[21] Appl. No.: 775,787

[22] Filed: Mar. 9, 1977

[51] Int. Cl.² .......................................... F16M 13/08
[52] U.S. Cl. ..................................... 135/66; 135/67; 135/80; 248/171
[58] Field of Search ...................... 135/66, 67, 77, 78, 135/79, 70, 80; 248/155, 155.2, 169, 171; 74/106, 520

[56] References Cited

U.S. PATENT DOCUMENTS

| 2,361,781 | 10/1944 | Lindsey et al. | 248/171 |
|---|---|---|---|
| 2,437,076 | 3/1948 | Clemens | 135/70 |
| 2,574,281 | 11/1951 | Olson | 74/520 |
| 2,682,275 | 6/1954 | Eyrich | 135/70 |
| 3,448,749 | 6/1969 | Stark | 135/70 |
| 3,850,395 | 11/1974 | O'Connor | 248/171 |

FOREIGN PATENT DOCUMENTS 881,317  6/1953  Germany ............................. 248/171

Primary Examiner—Werner H. Schroeder
Assistant Examiner—Conrad L. Berman
Attorney, Agent, or Firm—Schmidt, Johnson, Hovey & Williams

[57] ABSTRACT

A walking cane is provided with a collapsible stand adjacent its tip shiftable from an extended position wherein the stand supports the cane in an upright attitude, to a collapsed position wherein the stand nests neatly along the body of the cane above the tip, permitting the latter to engage the ground when the cane is used for walking. A manually manipulable remote control lever on the cane is mounted for over-center operation to permit selective locking of the stand in either its extended or collapsed position.

1 Claim, 5 Drawing Figures

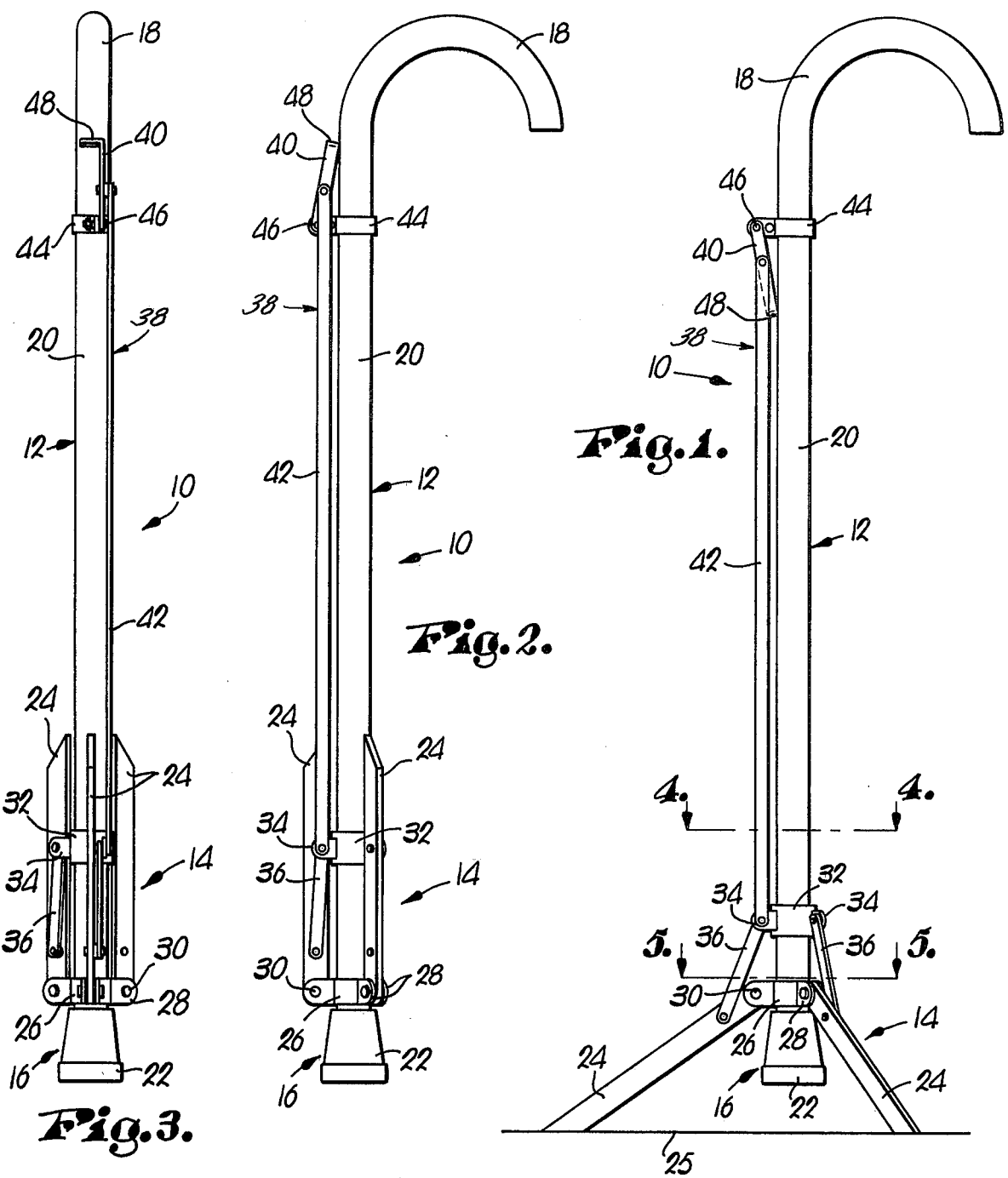

MANUALLY OPERABLE CRUTCH AND CANE STAND

It is an important object of the instant invention to provide canes, crutches and other walking devices with collapsible structure permitting easy accessibility when not in use as distinguished from laying the device on the floor or against a wall as is common practice.

Another important object is to provide canes and the like with a means shiftable to and from a position for holding the same in an upright attitude when not in use.

It is yet another important object of the instant invention to provide a walking aid with a stand shiftable to and from a ground-engaging position for selectively rendering the aid self-supporting in an upright attitude.

A still further important object of the present invention is to provide a walking aid with a shiftable stand as described having a remote control for conveniently shifting the stand to and from its supporting position.

In the drawing:

FIG. 1 is a side-elevational view of a manually operable cane stand made pursuant to my present invention, showing the stand mounted on a cane and in the extended position;

FIG. 2 is a side-elevational view showing the stand in the collapsed position;

FIG. 3 is a side-elevational view taken essentially at right angles to FIG. 2;

FIG. 4 is an enlarged cross-sectional view taken along line 4—4 of FIG. 1; and

FIG. 5 is an enlarged cross-sectional view taken along line 5—5 of FIG. 1.

Throughout the drawing there is shown a walking aid 10 comprising an elongate strut in the nature of a cane 12 and a collapsible, support stand 14 mounted on the cane 12 adjacent a ground-engaging end 16 of the latter.

The cane 12 includes, in addition to the ground-engaging end 16, an arcuate end 18 defining a manually engagable handle for the aid 10 and an elongate cylindrical body section 20 extending between ends 16 and 18. The end 16 has a conventional resilient tip 22 for increasing contact friction with a walking surface, as for example surface 25 (shown only in FIG. 1).

The stand 14 has three elongate legs 24 symmetrically arranged around the body section 20 adjacent end 16 by a mounting sleeve 26. The sleeve 26 is coaxially disposed on section 20 and has three sets of circumferentially spaced mounting ears 28 extending radially therefrom, each set of ears 28 supporting a pin 30 adapted to pivotally support one end of a respective leg 24. As shown for example in FIG. 1, the sleeve 26 is rigidly secured to section 20 immediately adjacent end 16 such that the legs 24 can pivot beyond the tip 22 on end 16 to engage the surface 25.

The stand 14 further comprises a collar 32 shiftably mounted on body section 20 spaced from sleeve 26 for sliding movement toward and away from the latter. The collar 32 has three outwardly projecting tabs 34 each pivotally supporting a respective bar 36 which is in turn pivotally coupled to a respective leg 24 at a point spaced from pin 30. Thus, sliding movement of the collar 32 along the section 20 effects in unison swinging movement of the legs 24 by virtue of the connections provided by the bars 36.

There is also provided a remote control 38 which includes manually manipulable means in the form of an elongate lever 40 adjacent end 18, and an elongate link 42 operably coupling the collar 32 and the lever 40. A mount 44 secured to cane 12 adjacent end 18 has a trunnion 46 carried in laterally offset relationship to the body section 20 of the cane 12 for pivotally securing the lever 40 to the cane 12. Additionally, the lever 40 has a stop 48 on the end remote from trunnion 46 for abutting against the body section 20 in a manner to be described hereinbelow.

As shown in FIGS. 1 and 2, the pivotal connection between the lever 40 and mount 44 at trunnion 46 is laterally offset from body section 20 a distance sufficient to permit an over-center action in the control 38. Thus, swinging movement of the lever 40 about trunnion 46 in one direction of rotation effects sliding movement of collar 32 in one direction relative to the cane 12 until the lever 40 reached a position wherein the latter is parallel to the longitudinal axis of the section 20, whereupon further swinging movement of the lever 40 in the same direction will cause sliding movement of the collar 32 in a direction opposite to that previously mentioned. This over-center feature of the control 38 permits the latter to operate not only as a remote actuator but also to serve as a locking device for retaining the stand 14 in either its extended or collapsed position.

Under normal walking conditions, the user would adjust the walking aid 10 to place the stabilizing stand 14 in its collapsed position as shown in FIG. 2. With the stand so positioned, the support 10 may be utilized much in the manner of a conventional cane by virtue of the fact that the legs 24 are neatly nested along the length of body section 20 to expose the ground-engaging tip 22.

Should the user desire to temporarily store the aid 10, as for example while sitting in a restaurant, he simply manipulates control lever 40 in a manner to rotate the latter counter-clockwise as viewed in FIG. 2, to a position shown in FIG. 1, wherein stop 48 abuts against body section 20 at a point below the trunnion 46. Thus, the lever 40 locks the stand 14 in its extended position to present a highly stable, self-supporting, ground-contacting structure whereby the aid 10 is maintained in an upright attitude without any additional means of support. With the aid 10 so disposed, the user can easily and conveniently retreive the latter when he desires to commence walking again.

In this connection, the user may simply actuate control lever 40 in the opposite direction to return the stand 14 to its collapsed position. It will be noted that when the walking aid 10 is adjusted such that the stand 14 is collapsed as shown in FIG. 2, the stop 48 abuts section 20 at a point above trunnion 46 to lock the stand 14 in the collapsed position by virtue of the over-center arrangement of control 38. In this manner, the somewhat bulky structure presented by extension of stand 14 is neatly and securely tucked alongside the section 20 between ends 16 and 18, whereby the tip 22 can provide stable, unobstructed engagement with the walking surface.

Thus, the present invention provides a walking aid having means for supporting itself in an upright position whereby no additional support structure is required for storing the aid and the user is relieved of the burden of bending or stooping to retrieve his walking aid. Moreover, the unique manner in which the stand 14 is shiftably supported on the cane 12 permits the user to enjoy the self-supporting feature while at the same time presenting the user with a compact, safe and convenient ground-engaging means when it is desired to walk with the aid 10. Operation of the control lever 40 not only quickly and easily shifts the stand 14 between its extended and nested positions but also serves to positively lock the stand 14 in one or the other of its positions.

The advantages of the present invention are particularly evident when it is remembered that most people who need a walking aid such as a cane or the like generally have very low body mobility such that it is extremely difficult for them to bend or otherwise maneuver to retrieve a fallen cane. In this connection, with conventional canes or the like it is often necessary to retrieve the latter from the floor since there has heretofore been no reliable means for storing such canes in an upright, easily retrievable position. Hence, with previously known walking aids, cripples and otherwise handicapped persons have been oftentimes forced to maneuver their body in an extremely taxing manner when retrieving a cane or crutch which has fallen to the floor. Such persons may now be greatly benefited by all the advantages found in the present invention as described hereinabove.

Having thus described the invention, what is claimed as new and desired to be secured by Letters Patent is:

1. An improved walking aid including:
   an elongate, normally upright strut having a lower and an upper end;
   a support stand adapted to be mounted on said strut and including a cylindrical sleeve, a number of elongated legs pivotally mounted in spaced relation on the outer circumference of said sleeve, a cylindrical collar shiftable toward and away from said sleeve, and a number of pivot bars respectively intercoupling said legs with said collar,
   said sleeve being rigidly secured on said strut adjacent said lower end, a portion of said strut projecting below said sleeve,
   said collar being disposed above said sleeve in captive coaxial relation to said strut for reciprocal movement along the longitudinal axis thereof toward and away from said sleeve whereby said stand is rendered shiftable between an extended position wherein said legs project below said portion of the strut for engaging the ground and a collapsed position wherein said legs are folded alongside said strut above said portion,
   said portion including friction-increasing means at said lower end for securely engaging the ground when said stand is disposed in its collapsed position; and
   a remote control attached to the strut adjacent said upper end for selectively collapsing or extending said stand,
   said control having a manually manipulable lever, a mount pivotally securing said lever to said strut for up and down swinging movement about an axis laterally offset from said strut, and an elongated link extending between said stand and said lever in offset relation to said strut,
   said lever, mount and link cooperating to form an overcenter action whereby to releasably retain said stand in either of said positions.

* * * * *